United States Patent
Ito et al.

(10) Patent No.: US 10,549,262 B2
(45) Date of Patent: Feb. 4, 2020

(54) WATER ABSORPTION TREATMENT MATERIAL AND METHOD FOR MANUFACTURING THE SAME

(71) Applicant: DAIKI CO., LTD., Tokyo (JP)

(72) Inventors: Hiroshi Ito, Tokyo (JP); Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 3 days.

(21) Appl. No.: 15/634,180

(22) Filed: Jun. 27, 2017

(65) Prior Publication Data
US 2017/0291160 A1 Oct. 12, 2017

Related U.S. Application Data

(63) Continuation of application No. PCT/JP2016/057086, filed on Mar. 8, 2016.

(30) Foreign Application Priority Data

Mar. 25, 2015 (JP) .................. 2015-061990

(51) Int. Cl.
| | |
|---|---|
| *B32B 5/16* | (2006.01) |
| *B01J 20/28* | (2006.01) |
| *A01K 1/015* | (2006.01) |
| *B01J 20/32* | (2006.01) |

(52) U.S. Cl.
CPC ......... *B01J 20/28016* (2013.01); *A01K 1/015* (2013.01); *B01J 20/3223* (2013.01)

(58) Field of Classification Search
CPC ........... B30B 9/28; B30B 11/00; B30B 11/18; B30B 11/22; B01J 2/006; A01K 1/0152; A01K 23/00

USPC .......................................... 428/403; 424/490
See application file for complete search history.

(56) References Cited

U.S. PATENT DOCUMENTS

| | | | | |
|---|---|---|---|---|
| 9,480,971 B2 * | 11/2016 | Carlsson | ............... | B01J 23/002 |
| 9,854,786 B2 * | 1/2018 | Mochizuki | ........... | A01K 1/0152 |
| 2008/0022940 A1 * | 1/2008 | Kirsch | ................ | A01K 1/0152 |
| | | | | 119/173 |

(Continued)

FOREIGN PATENT DOCUMENTS

| | | |
|---|---|---|
| JP | S54-049989 A | 4/1979 |
| JP | 5-13155 U | 2/1993 |

(Continued)

OTHER PUBLICATIONS

May 24, 2016 Written Opinion issued in International Patent Application No. PCT/JP2016/057086.

(Continued)

*Primary Examiner* — Hoa (Holly) Le
(74) *Attorney, Agent, or Firm* — Oliff PLC

(57) ABSTRACT

Provided is a water absorption treatment material and a method for manufacturing the same, according to which separation of a coating layer portion is not likely to occur. A water absorption treatment material includes a granular core portion and a coating layer portion. A recessed portion is formed on the surface of the granular core portion. The recessed portion is intentionally formed on the surface of the granular core portion. The coating layer portion is provided so as to cover the surface of the granular core portion. A portion of the coating layer portion enter the recessed portion.

16 Claims, 16 Drawing Sheets

(56) References Cited

U.S. PATENT DOCUMENTS

| | | | | |
|---|---|---|---|---|
| 2012/0135860 | A1* | 5/2012 | Carlsson | B01J 23/002 502/306 |
| 2014/0005042 | A1* | 1/2014 | Feaviour | B01J 23/52 502/304 |
| 2015/0132379 | A1* | 5/2015 | Kawano | A61K 31/4439 424/467 |
| 2016/0106069 | A1* | 4/2016 | Mochizuki | A01K 1/0152 427/212 |
| 2017/0291159 | A1* | 10/2017 | Ito | B01J 20/28016 |

FOREIGN PATENT DOCUMENTS

| | | |
|---|---|---|
| JP | H10-262482 A | 10/1998 |
| JP | 2004-121036 A | 4/2004 |
| JP | 2007-190026 A | 8/2007 |
| JP | 2014-43 A | 1/2014 |
| JP | 2014-183778 A | 10/2014 |
| WO | 2010/125369 A2 | 11/2010 |
| WO | 2012/110781 A1 | 8/2012 |
| WO | 2014-041634 A1 | 3/2014 |
| WO | 2014/158978 A1 | 10/2014 |

OTHER PUBLICATIONS

May 24, 2016 Search Report issued in International Patent Application No. PCT/JP2016/057086.

Jun. 5, 2018 Office Action issued in Japanese Patent Application No. 2015-061990.

Apr. 10, 2018 Search Report issued in European Patent Application No. 16 76 8397.

* cited by examiner

WATER ABSORPTION TREATMENT MATERIAL AND METHOD FOR MANUFACTURING THE SAME

CROSS REFERENCE TO RELATED APPLICATION

This is a Continuation of International Application No. PCT/JP2016/057086 filed Mar. 8, 2016, which claims the benefit of Japanese Application No. 2015-061990 filed Mar. 25, 2015. The contents of these applications are hereby incorporated by reference in their entirety.

TECHNICAL FIELD

The present invention relates to a water absorption treatment material that absorbs a liquid such as human or animal excreta, and a method for manufacturing the same.

BACKGROUND ART

Patent Document 1 discloses an excreta treatment material, which is a type of water absorption treatment material. The excreta treatment material is provided with a granular core portion and a coating layer portion that covers the granular core portion. The coating layer portion contains an adhesive material and has a function of adhering pieces of the excreta treatment material together, which have absorbed excreta during use. Accordingly, a clump composed of multiple pieces of the excreta treatment material is formed after use.

CITATION LIST

Patent Document

Patent Document 1: JP 2007-190026A

SUMMARY OF INVENTION

Technical Problem

Thus, the coating layer portion contributes to forming a clump of the water absorption treatment material after use. However, in the conventional water absorption treatment material, the coating layer portion sometimes separates from the granular core portion before use. The separation of the coating layer portion leads to a decrease in the quality of the water absorption treatment material.

Solution to Problem

The present invention has been made in view of the foregoing circumstances and aims to provide a water absorption treatment material in which separation of a coating layer portion is not likely to occur, and a method for manufacturing the same.

The water absorption treatment material according to the present invention includes: a granular core portion having a recessed portion formed intentionally on its surface; and a coating layer portion that covers the surface of the granular core portion, wherein a portion of the coating layer portion enters the recessed portion.

In the water absorption treatment material, a recessed portion is formed on the surface of the granular core portion. The coating layer portion is provided so as to enter the recessed portion. Accordingly, since a structure is used in which the granular core portion and the coating layer portion are engaged with each other, separation of the coating layer portion is not likely to occur.

Also, the method for manufacturing the water absorption treatment material according to the present invention includes: a core portion forming step of forming a granular core portion having a recessed portion on its surface; and a coating forming step of forming a coating layer portion that covers the surface of the granular core portion, wherein in the core portion forming step, the recessed portion is formed intentionally, and in the coating forming step, the coating layer portion is formed such that a portion of the coating layer portion enters the recessed portion.

In the manufacturing method, a recessed portion is formed on the surface of the granular core portion. The coating layer portion is formed so as to enter the recessed portion. Accordingly, since a structure is used in which the granular core portion and the coating layer portion are engaged with each other, separation of the coating layer portion is not likely to occur.

Advantageous Effects of Invention

The present invention realizes a water absorption treatment material and a method for manufacturing the same, according to which separation of a coating layer portion is not likely to occur.

DESCRIPTION OF EMBODIMENTS

Figure 1:
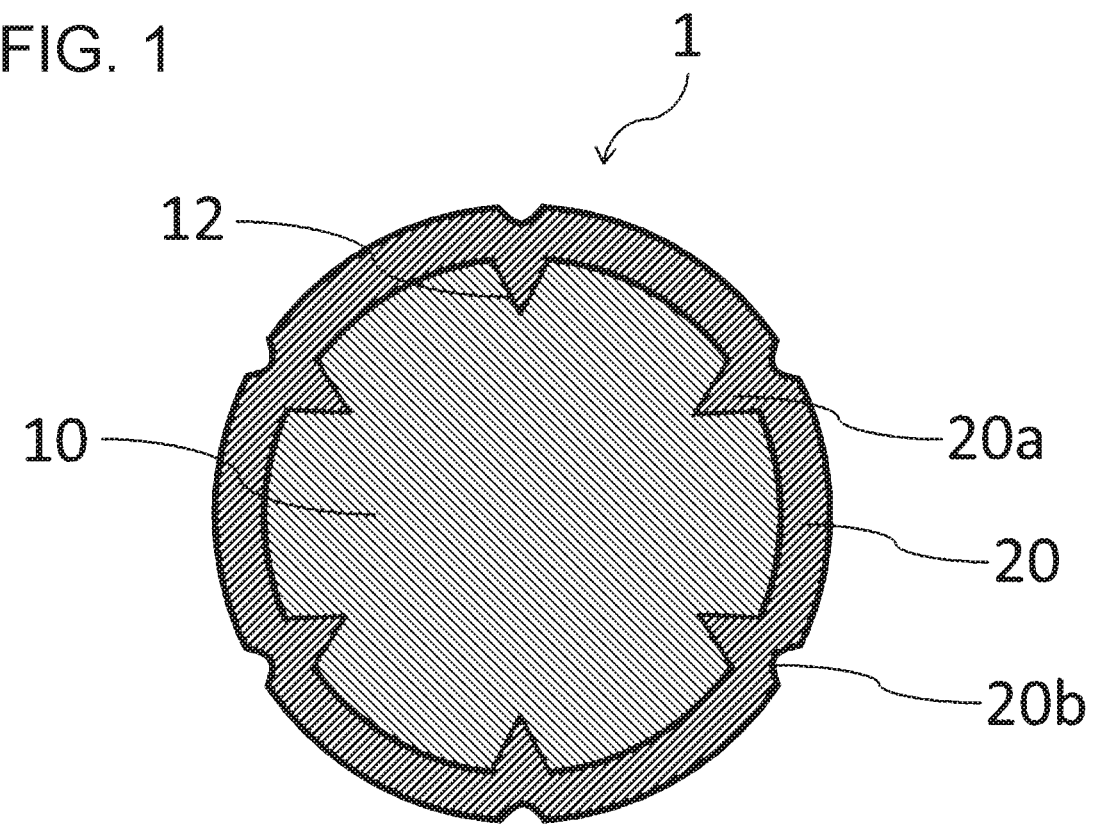
FIG. 1 is a cross-sectional view showing an embodiment of a water absorption treatment material according to the present invention.

Hereinafter, an embodiment of the present invention will be described in detail with reference to the drawings. Note that in the description of the drawings, like elements are denoted by like reference numerals and redundant description thereof is not included.

FIG. 1 is a cross-sectional view showing an embodiment of a water absorption treatment material according to the present invention. A water absorption treatment material 1 is a water absorption treatment material that absorbs a liquid, and includes a granular core portion 10 and a coating layer portion 20. The water absorption treatment material 1 is an excreta treatment material for a pet such as a cat or a dog, for example.

Figure 2:
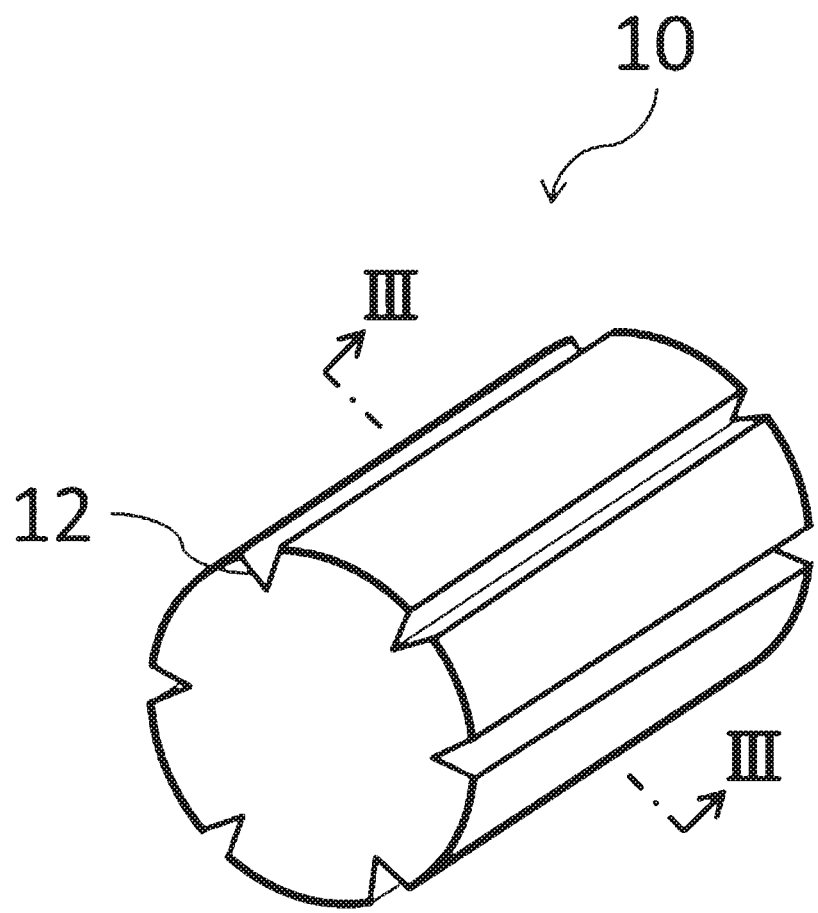
FIG. 2 is a perspective view showing a granular core portion in the water absorption treatment material shown in FIG. 1.
Figure 3:
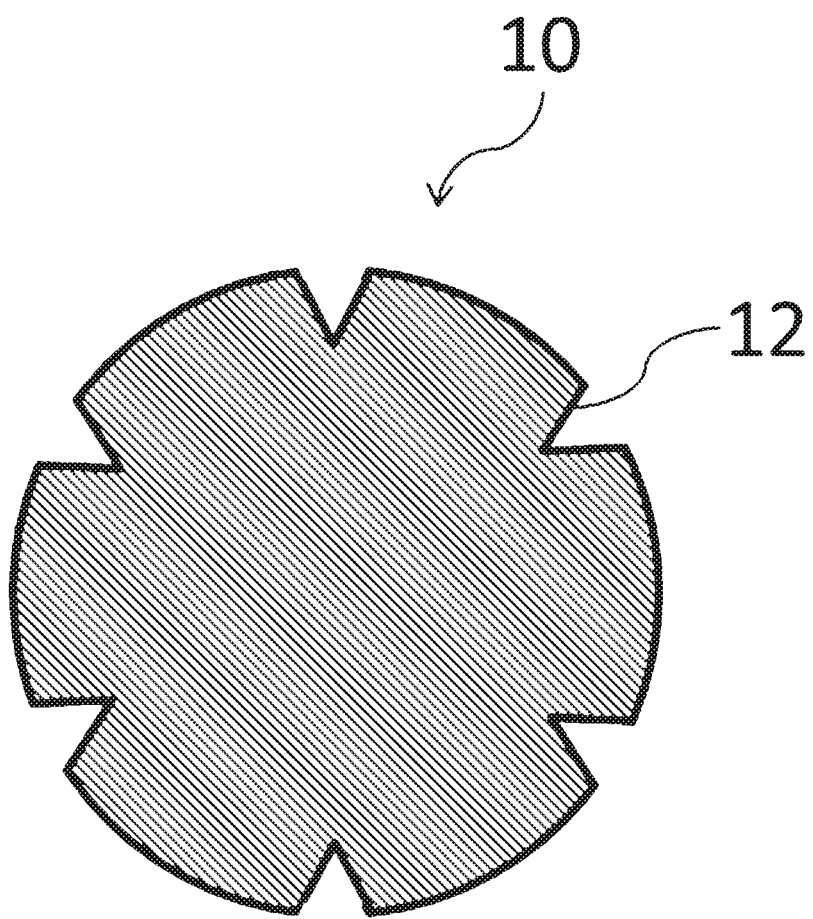
FIG. 3 is a cross-sectional view taken along line III-III shown in FIG. 2.

FIG. 2 is a perspective view showing the granular core portion 10. Also, FIG. 3 is a cross-sectional view taken along line III-III in FIG. 2. FIG. 3 shows a cross section similar to that shown in FIG. 1. The granular core portion 10 is formed into a granular shape. In the present embodiment, the granular core portion 10 is approximately cylindrical. The granular core portion 10 contains a water-absorptive material and has a function of absorbing and retaining liquid such as excreta. For example, paper, tea grounds, plastic, or bean curd lees can be used as the water-absorptive material. The water-absorptive material is preferably the main material of the granular core portion 10. Here, the main material of the granular core portion 10 refers to a material that constitutes the granular core portion 10 and has the largest weight ratio in the granular core portion 10.

Paper refers to a material mainly composed of pulp. Examples of paper include recycled vinyl chloride wallpaper (paper obtained by recycling vinyl chloride wallpaper), fluff pulp, papermaking sludge (including pulp sludge), and the like, in addition to normal paper. It is also possible to use recycled paper diapers (plastic obtained by recycling paper diapers) as the plastic, for example. The bean curd lees are preferably dried bean curd lees.

Recessed portions 12 are formed on the surface of the granular core portion 10. The recessed portions 12 are formed into groove shapes and extend in the length direction of the granular core portion 10 (see FIG. 2). The recessed portions 12 extend over the entire length direction of the granular core portion 10. In the present embodiment, multiple (specifically, six) recessed portions 12 are provided. The recessed portions 12 are provided regularly on the surface of the granular core portion 10. Specifically, the six recessed portions 12 are provided at approximately equal intervals in the circumferential direction of the granular core portion 10.

As will be described later, the recessed portions 12 are intentionally formed on the surface of the granular core portion 10. Here, the "intentionally-formed" recessed portions 12 refer to recessed portions 12 that are formed using a method according to which it is possible to control the shapes, sizes, and positions of the recessed portions 12.

On the surface of the granular core portion 10, the surface area ratio of the portions at which the recessed portions 12 are provided with respect to the entire surface is preferably 10% or more and 90% or less, and more preferably 20% or more and 60% or less.

Returning to FIG. 1, the coating layer portion 20 is provided so as to cover the surface of the granular core portion 10. The coating layer portion 20 covers the entire surface of the granular core portion 10. Portions (portions 20a) of the coating layer portion 20 enter the recessed portions 12.

In the present embodiment, the coating layer portion 20 enters the approximate entirety of each recessed portion 12. Also, portions 20b on the surface of the coating layer portion 20 that are located over the recessed portions 12 are recessed.

The coating layer portion 20 contains an adhesive material and has a function of adhering pieces of the water absorption treatment material 1 together, which have absorbed liquid during use. For example, water-absorptive polymer, starch, CMC (carboxymethyl cellulose), PVA (polyvinyl alcohol), or dextrin can be used as the adhesive material. The coating layer portion 20 contains a water-absorptive material in addition to the adhesive material. For example, paper, tea grounds, plastic, or bean curd lees can be used as the water-absorptive material.

Next, an example of a method for manufacturing the water absorption treatment material 1 will be described as an embodiment of a method for manufacturing a water absorption treatment material according to the present invention. The manufacturing method includes a core portion forming step and a coating forming step.

The core portion forming step is a step of forming the granular core portion 10, which has the recessed portions 12 on its surface. In this step, the material (core portion material) constituting the granular core portion 10 is shredded using a pulverizer or the like, and the resulting material is introduced into a mixer and mixed together. Then, water is added according to need, and thereafter the core portion material is subjected to extrusion granulation (granulation step).

Figure 4:
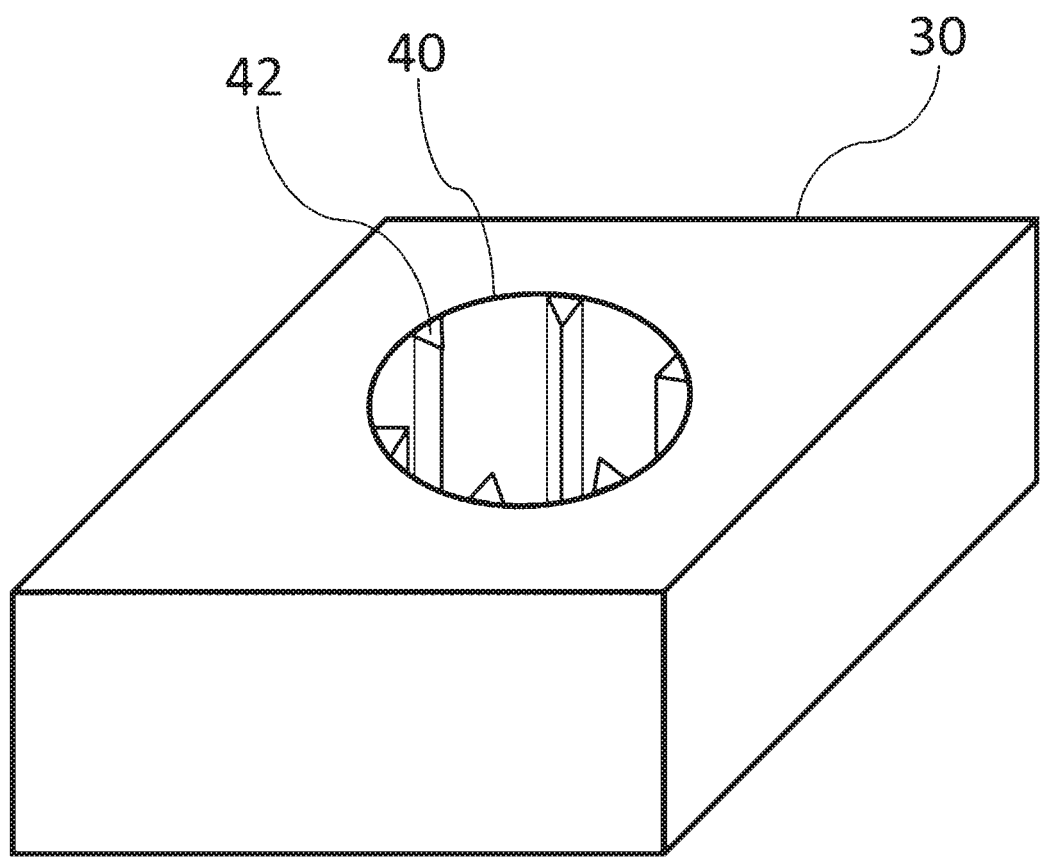
FIG. 4 is a perspective view showing a portion of a die used to manufacture the water absorption treatment material shown in FIG. 1.
Figure 5:
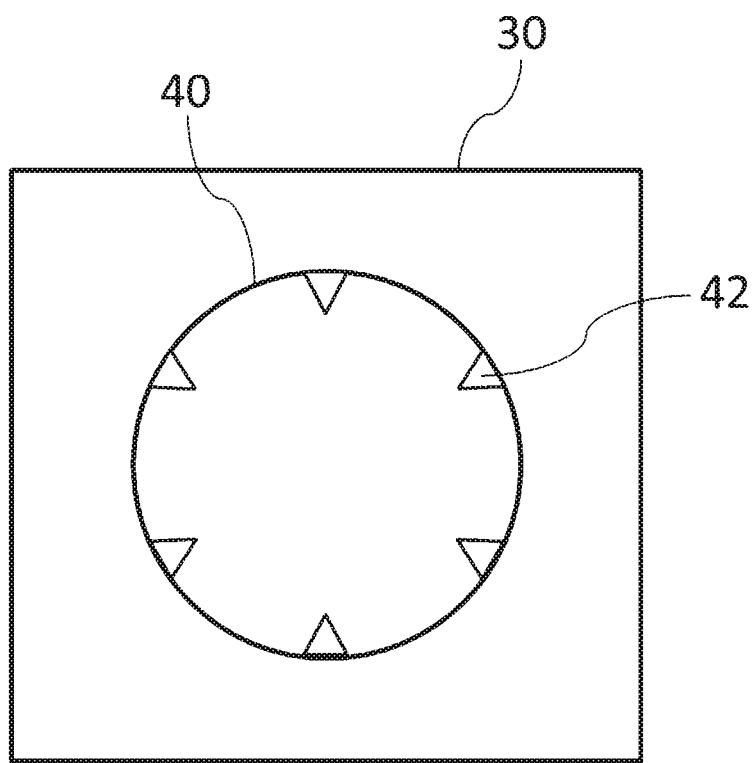
FIG. 5 is a plan view showing a portion of a die used to manufacture the water absorption treatment material shown in FIG. 1.

FIGS. 4 and 5 are a perspective view and a plan view that each show a portion of a die used for the extrusion granulation. A die 30 has a through hole 40. Note that in actuality, a plurality of through holes 40 are formed in one die 30, but only one through hole 40 is shown here. The inner surface of the through hole 40 is provided with protruding portions 42.

The protruding portions 42 are for forming the recessed portions 12. For this reason, the shapes, sizes, and positions of the protruding portions 42 are set such that the recessed portions 12 having the above-described configuration are formed. In the present embodiment, the protruding portions 42 are protrusions that extend in the thickness direction of the die 30. Multiple (specifically, six) protruding portions 42 are provided. These protruding portions 42 are aligned regularly on the inner surface of the through hole 40. Specifically, the six protruding portions 42 are provided at approximately equal intervals in the circumferential direction of the through hole 40.

In the granulation step, the core portion material is pressed into the die 30. Accordingly, the core portion material is granulated at the time of passing through the through hole 40. At this time, grooves (recessed portions 12) corresponding to the protruding portions 42 are formed on the portions of the core portion material that come into contact with the protruding portions 42. By cutting the granulated substance extruded from the through hole 40 to a predetermined length, the granular core portion 10 having the recessed portions 12 is obtained. Thus, in the present embodiment, the formation of the recessed portions 12 is performed at the same time as the extrusion granulation. Also, the recessed portions 12 are formed intentionally.

The coating forming step is a step of forming the coating layer portion 20 that covers the surface of the granular core portion 10. In this step, a coating apparatus or the like is used to attach the material (covering material) constituting the coating layer portion 20 to the entire surface of the granular core portion 10. The attachment of the covering material can be performed through applying or spraying, for example. At this time, the coating layer portion 20 is formed such that portions of the coating layer portion 20 enter the recessed portions 12. Also, the coating layer portion 20 is formed such that portions on the surface of the coating layer portion 20 that are located over the recessed portions 12 are recessed. For example, by uniformly applying the covering material on the surface of the granular core portion 10 or the like, it is possible to form the coating layer portion 20 having recesses that correspond to the recessed portions 12.

Thereafter, by passing the thus-obtained water absorption treatment material through a sieve, only the water absorption treatment material that satisfies a predetermined specification is extracted. Then, the extracted water absorption treatment material is dried using a dryer. According to the above description, the water absorption treatment material 1 is obtained.

Effects of the present embodiment will be described hereinafter. In the present embodiment, the recessed portions 12 are formed on the surface of the granular core portion 10. The coating layer portion 20 is provided so as to enter the recessed portions 12. Accordingly, since a structure is used in which the granular core portion 10 and the coating layer portion 20 are engaged with each other, separation of the coating layer portion 20 is not likely to occur. Separation of the coating layer portion 20 also causes dust when the water absorption treatment material 1 is used, but according to the present embodiment, the occurrence of dust can be suppressed.

By appropriately setting the size of the region in which the granular core portion 10 and the coating layer portion 20 are engaged with each other, the effects can be improved. From this viewpoint, on the surface of the granular core portion 10, the surface area ratio of the portions at which the recessed portions 12 are provided with respect to the entire surface is preferably 10% or more and 90% or less, and more preferably 20% or more and 60% or less.

The recessed portions 12 are intentionally formed on the surface of the granular core portion 10. Since the shapes, sizes, and positions of the recessed portions 12 can be controlled accordingly, the structure in which the granular core portion 10 and the coating layer portion 20 are engaged with each other can be reliably obtained. Also, it is possible to suppress structural variations in the recessed portions 12 and eventually in the water absorption treatment material 1 to a low level compared to the case of unintentionally forming the recessed portions 12. Furthermore, since the predictability of the shapes, sizes, and positions of the formed recessed portions 12 increases, it is easier to manage the step of manufacturing the water absorption treatment material 1. In contrast to this, in the case of unintentionally forming the recessed portions 12, the shapes, sizes, and positions of the formed recessed portions 12 cannot be known beforehand. For this reason, for example, manufacturing conditions at the time of forming the coating layer portion 20 are difficult to optimally adjust and the like, and thus management of the step of manufacturing the water absorption treatment material 1 is more difficult.

The coating layer portion 20 covers the entire surface of the granular core portion 10. The coating layer portion 20 is advantageous in that it is relatively easy to form since it is obtained by attaching the covering material to the entire surface of the granular core portion 10.

The portions 20b on the surface of the coating layer portion 20 that are located over the recessed portions 12 are recessed. Accordingly, since the surface area (surface area of the coating layer portion 20) of the portion that receives the liquid during use is larger, it is possible to improve the water absorption speed of the water absorption treatment material 1. Note that it is not essential to provide the recesses on the surface of the coating layer portion 20.

The recessed portions 12 are provided regularly on the surface of the granular core portion 10. Accordingly, it is possible to prevent imbalance of the stress acting on the boundary between the granular core portion 10 and the coating layer portion 20. These regular recessed portions 12 are obtained because the recessed portions 12 are intentionally formed.

The recessed portions 12 are in the form of grooves that extend in the length direction of the granular core portion 10. The recessed portions 12 with this shape are advantageous in that they are relatively easy to form. In actuality, in the present embodiment, as described above, the recessed portions 12 are formed using a simple method of providing the protruding portions 42 on the inner surface of the through hole 40.

The multiple protruding portions 42 are provided at equal intervals in the circumferential direction on the inner surface of the through hole 40. Accordingly, during extrusion granulation, it is possible to prevent an imbalance of pressure received by the core portion material from the inner surface of the through hole 40. Thus, from the viewpoint of increasing the uniformity of the pressure in the circumferential direction of the through hole 40, it is preferable that four or more protruding portions 42 are provided.

Figure 6:
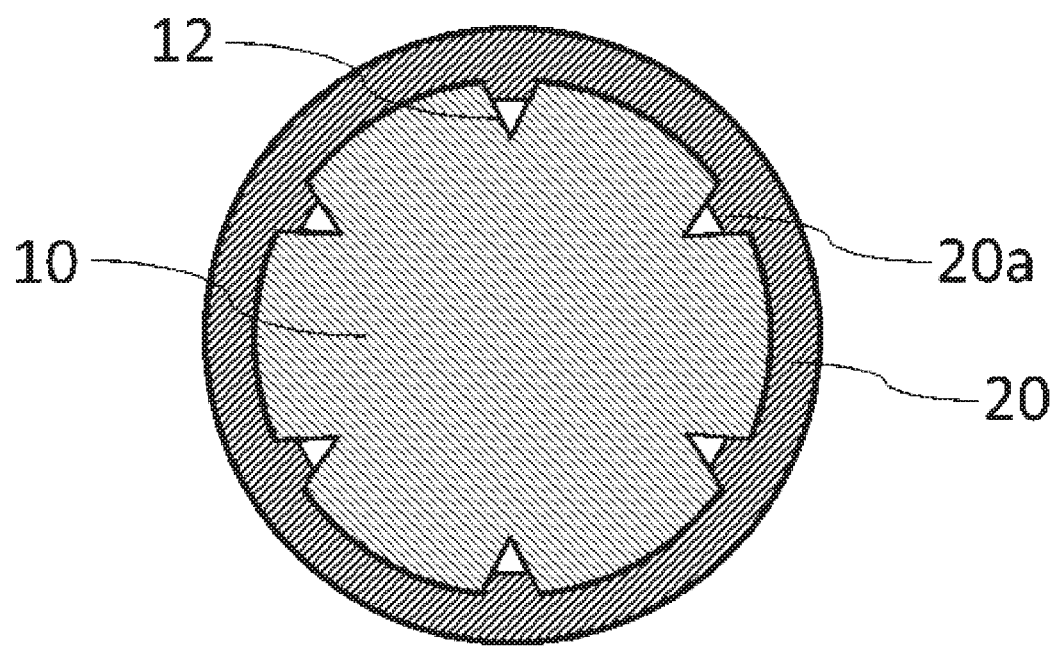
FIG. 6 is a cross-sectional view illustrating a modified example of the coating layer portion.

The present invention is not limited to the above-described embodiment, and various modifications are possible. The above-described embodiment showed an example in which the coating layer portion 20 enters approximately the entirety of each recessed portion 12. However, as shown in FIG. 6, the coating layer portion 20 may enter only a portion of each recessed portion 12.

Figure 7:
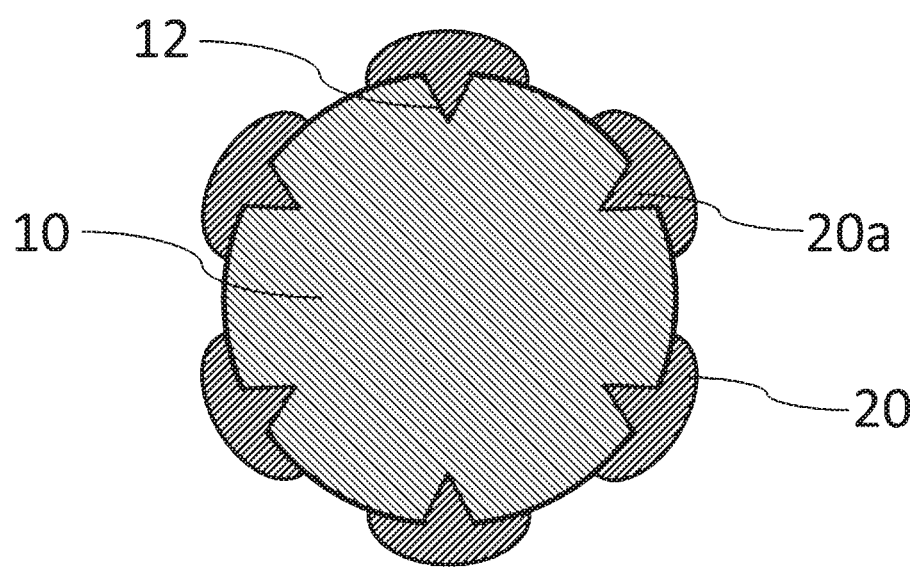
FIG. 7 is a cross-sectional view illustrating another modified example of the coating layer portion.

The above-described embodiment showed an example in which the coating layer portion 20 is formed so as to cover the entirety of the surface of the granular core portion 10. However, as shown in FIG. 7, the coating layer portion 20 may be formed so as to cover only a portion of the surface of the granular core portion 10. In this case, a portion of the granular core portion 10 is exposed to the outside of the water absorption treatment material 1. This makes it possible for the liquid such as excreta to rapidly reach the granular core portion 10 without being blocked by the coating layer portion 20 at the portion. Accordingly, partially forming the coating layer portion 20 is advantageous for increasing the water absorptivity of the water absorption treatment material 1.

Figure 8:
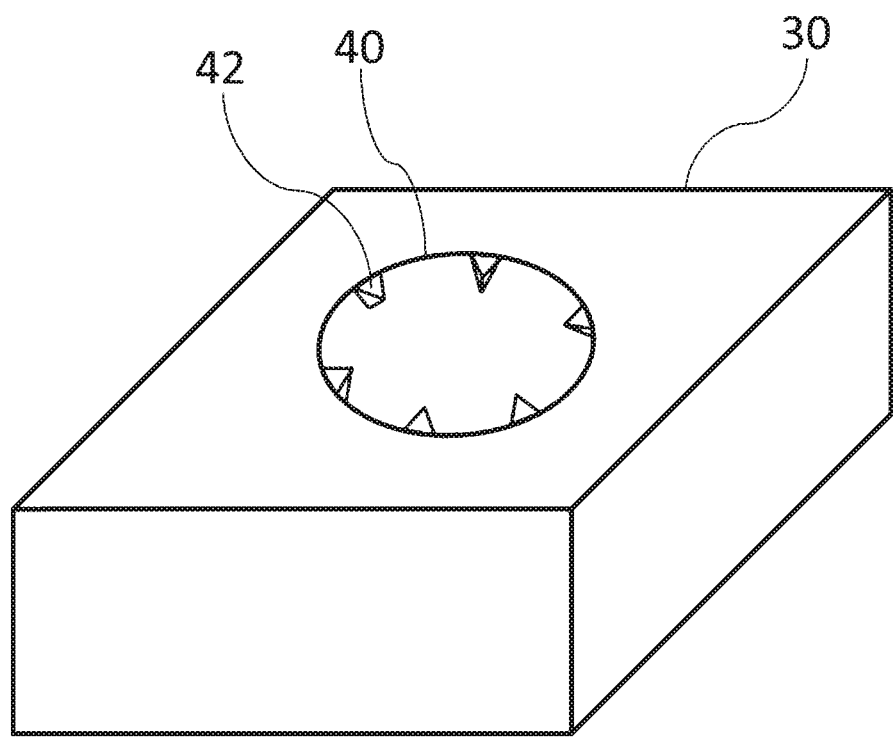
FIG. 8 is a perspective view illustrating a modified example of a protruding portion provided in a through hole in the die.
Figure 9:
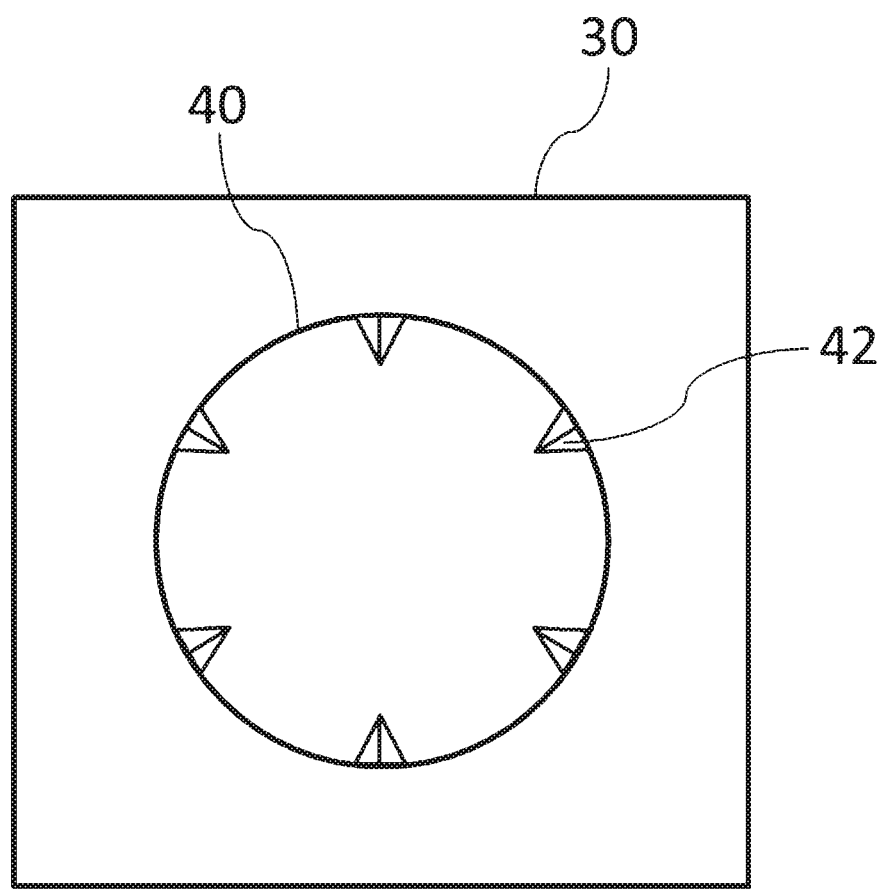
FIG. 9 is a plan view illustrating a modified example of a protruding portion provided in the through hole in the die.

In the above-described embodiment, protruding portions 42 composed of protrusions that extend in the thickness direction of the die 30 were illustrated. However, as shown in FIGS. 8 and 9, the protruding portions 42 may be composed of projections provided near the exit of the through hole 40. FIG. 8 is a perspective view from the exit side of the through hole 40, and FIG. 9 is a plan view from the entrance side of the through hole 40. In these drawings, protruding portions 42 that are composed of projections in the form of approximate triangular pyramids are shown. It is possible to form recessed portions 12 having the above-described configuration using protruding portions 42 with this shape as well.

Figure 10:
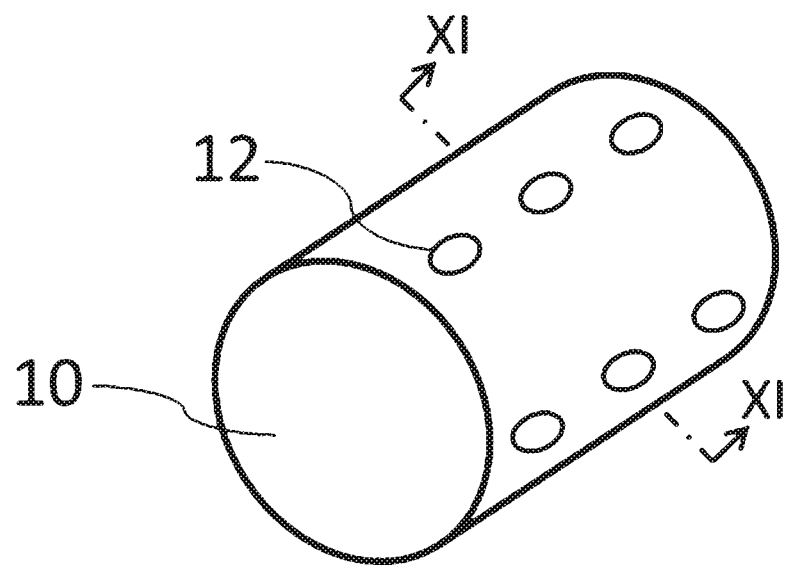
FIG. 10 is a perspective view illustrating a modified example of the recessed portion.
Figure 11:
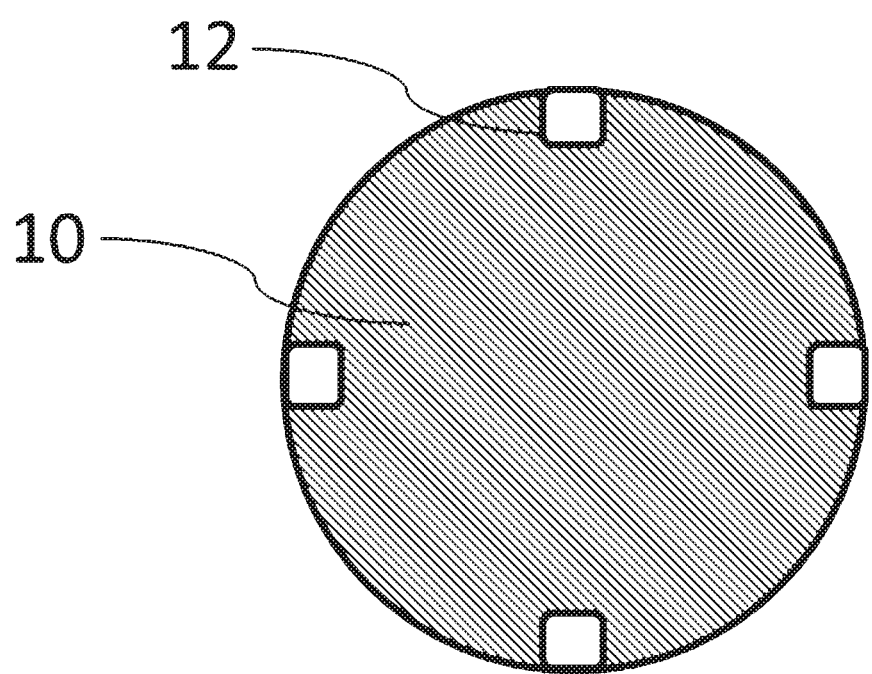
FIG. 11 is a cross-sectional view taken along line XI-XI shown in FIG. 10.
Figure 12:
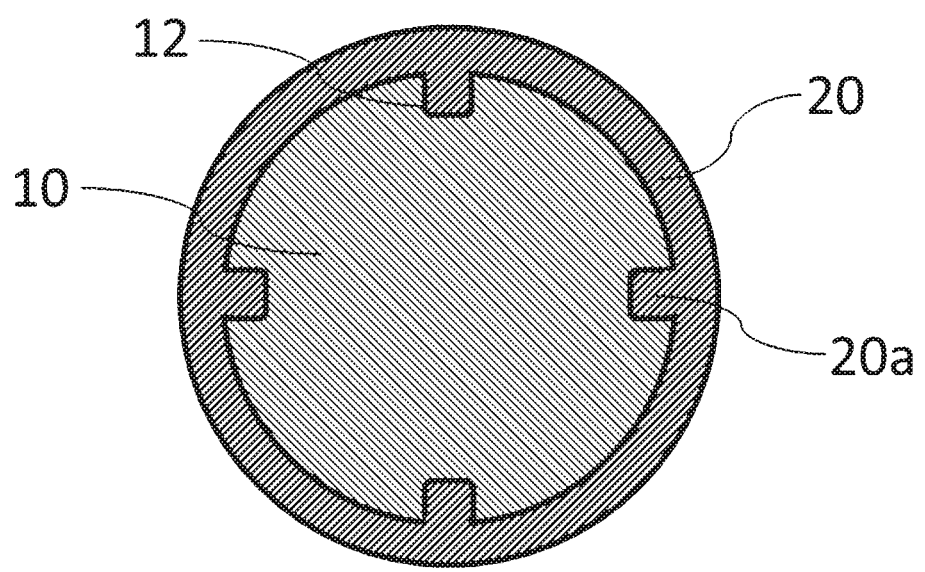
FIG. 12 is a cross-sectional view showing a water absorption treatment material that includes the granular core portion shown in FIG. 10.

The above-described embodiment illustrated groove-shaped recessed portions 12. However, as shown in FIGS. 10 and 11, the recessed portions 12 may be spot-shaped in plan view. FIG. 11 shows a cross section taken along line XI-XI shown in FIG. 10. Also, FIG. 12 is a cross-sectional view showing a water absorption treatment material including a granular core portion 10 with this configuration. In FIG. 12 as well, portions (portions 20a) of the coating layer portion 20 enter the recessed portions 12.

Figure 13:
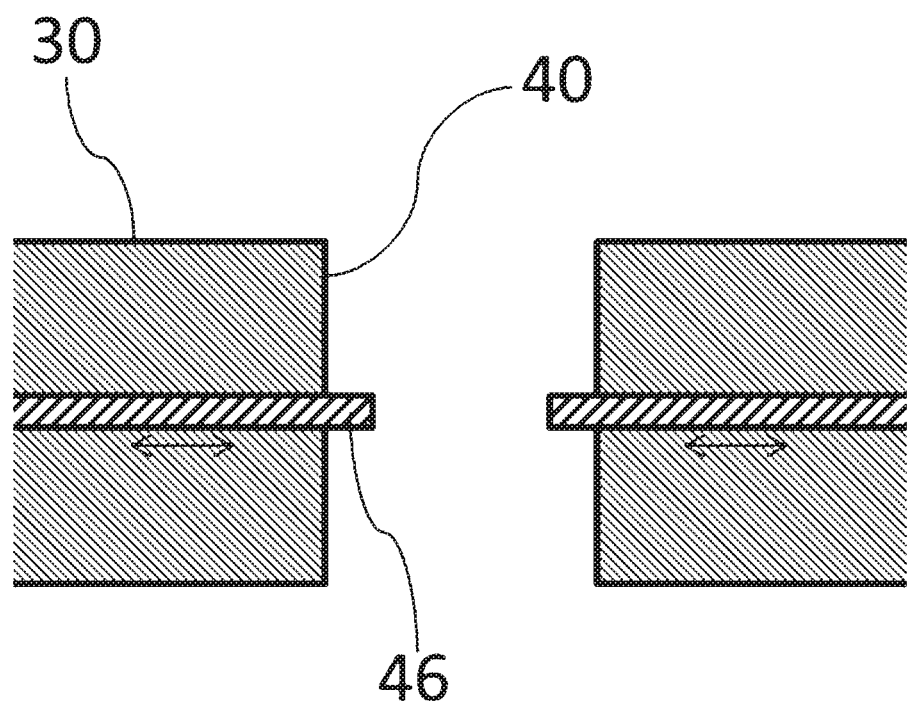
FIG. 13 is an end surface view showing a portion of a die used to form the granular core portion shown in FIG. 10.
Figure 14:
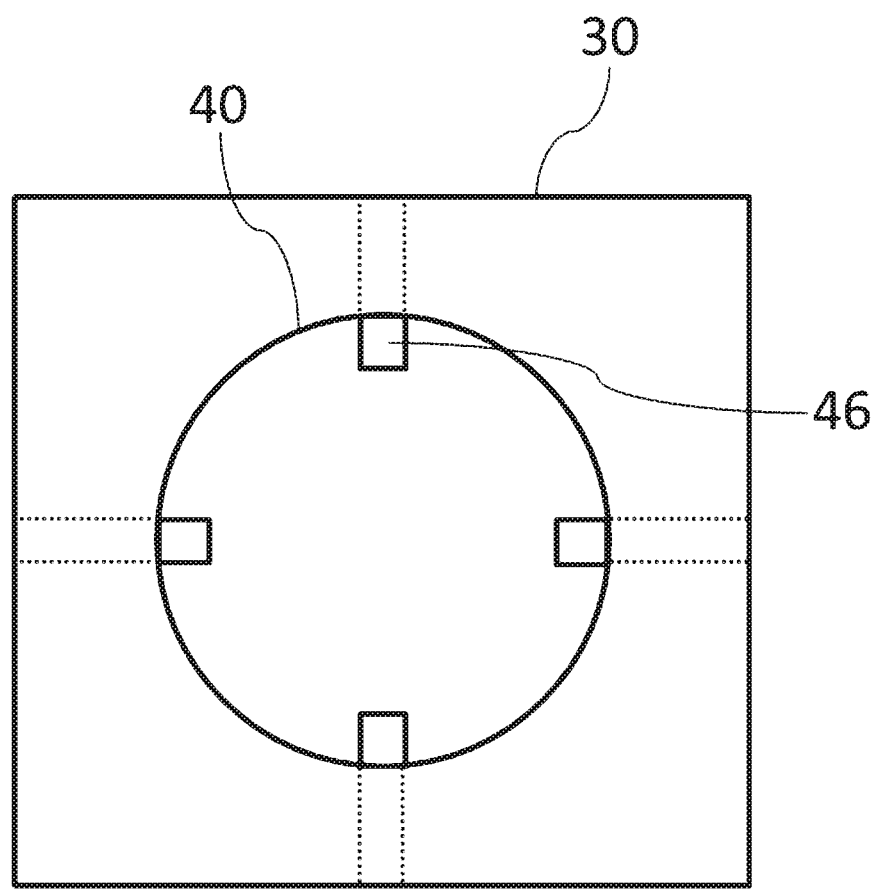
FIG. 14 is a plan view showing a portion of a die used to form the granular core portion shown in FIG. 10.
Figure 15:
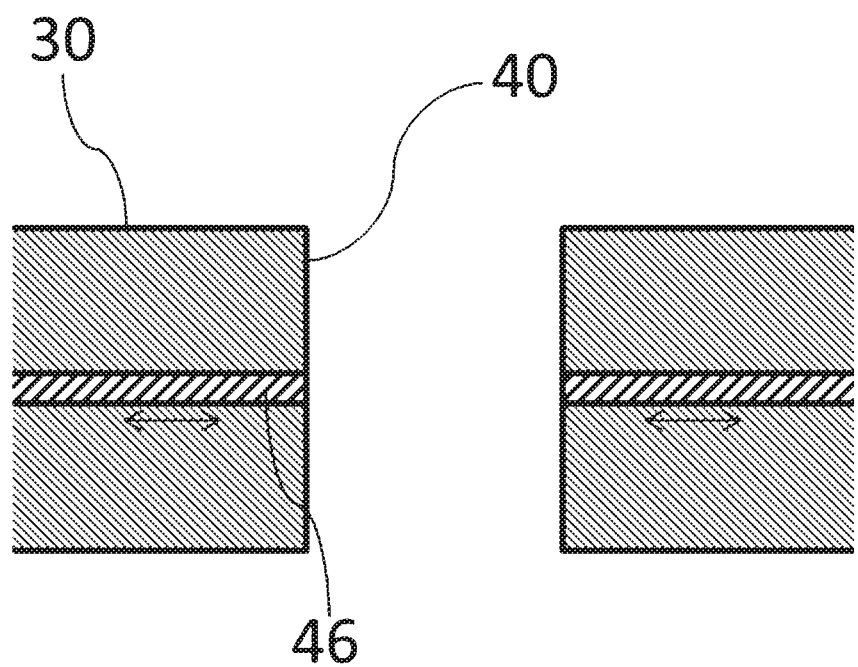
FIG. 15 is an end surface view showing a portion of a die used to form the granular core portion shown in FIG. 10.
Figure 16:
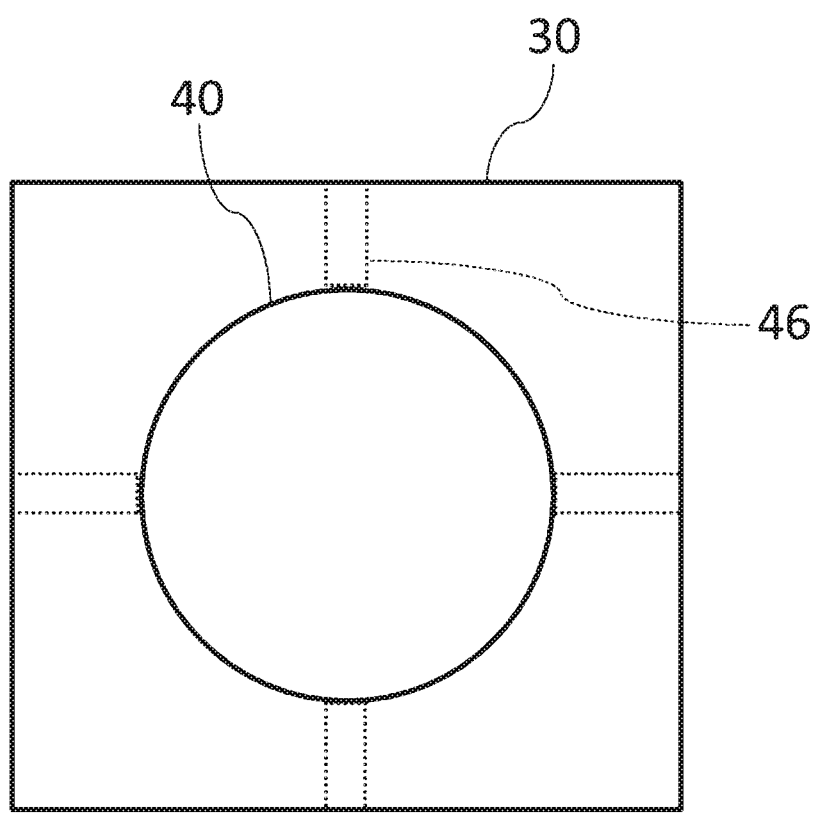
FIG. 16 is a plan view showing a portion of a die used to form the granular core portion shown in FIG. 10.

The spot-shaped recessed portions 12 can be formed using a die 30 having the following configuration, for example. That is, as shown in FIGS. 13 to 16, rod-shaped members 46 are provided in the through hole 40 of the die 30. The rod-shaped members 46 are constituted so as to move reciprocally along the radial direction (direction indicated by the arrows in FIGS. 13 and 15) of the through hole 40. FIGS. 13 and 14 show a state at a time when the rod-shaped members 46 are the closest to the central axis of the through hole 40. At this time, the leading ends of the rod-shaped members 46 are located between the inner surface of the through hole 40 and the central axis of the through hole 40. In other words, the rod-shaped members 46 protrude from the inner surface of the through hole 40. On the other hand, FIGS. 15 and 16 show a state at a time when the rod-shaped members 46 are the farthest from the central axis of the through hole 40. At this time, the leading ends of the rod-shaped members 46 are located at the inner surface of the through hole 40.

When the core portion material passes through the through hole 40 during extrusion granulation, the spot-shaped recessed portions 12 shown in FIGS. 10 and 11 can be formed by intermittently causing the rod-shaped members 46 to protrude from the inner surface of the through hole 40. Note that the rod-shaped members 46 that move reciprocally may be provided outside of the die 30 instead of inside of the die 30.

The above-described embodiment illustrated recessed portions 12 that were intentionally formed on the surface of the granular core portion 10. However, the recessed portions may be formed unintentionally on the surface of the granular core portion 10. Here, an "unintentionally formed" recessed portion refers to a recessed portion other than an intentionally formed recessed portion. For example, although sometimes a crack or the like is formed in the granular core portion 10 due to accidental or inevitable causes in the step of manufacturing the water absorption treatment material, the shape, size, and position of the crack or the like cannot be controlled, and thus a crack or the like corresponds to an "unintentionally formed" recessed portion.

The above-described embodiment showed an example in which multiple recessed portions 12 are formed. However, it is also possible to provide only one recessed portion 12. The same follows for the protruding portions 42 provided in the through hole 40.

The above-described embodiment illustrated an approximately columnar granular core portion 10. However, the shape of the granular core portion 10 need only be granular, and may be a sphere or an ellipsoid.

LIST OF REFERENCE NUMERALS

1 Water absorption treatment material
10 Granular core portion
12 Recessed portion
20 Coating layer portion
30 Die
40 Through hole
42 Protruding portion
46 Rod-shaped member

The invention claimed is:

1. A water absorption treatment material comprising:
   a granular core portion having a recessed portion formed into a surface of the granular core portion; and
   a coating layer portion covering the surface of the granular core portion, the coating layer portion entering the recessed portion of the granular core portion, and the coating layer portion having a recessed coating portion located on an exposed outer surface of the coating layer portion where the coating layer portion enters the recessed portion of the granular core portion such that the recessed coating portion is radially aligned with the recessed portion.

2. The water absorption treatment material according to claim 1, wherein the coating layer portion covers an entire surface of the granular core portion.

3. The water absorption treatment material according to claim 1, wherein the coating layer portion covers less than an entire surface of the granular core portion.

4. The water absorption treatment material according to claim 1, wherein:
   the granular core portion is approximately cylindrical, and
   the recessed portion of the granular core portion is groove-shaped and extends in a longitudinal direction of the granular core portion.

5. The water absorption treatment material according to claim 4, wherein the recessed portion extends along an entire length of the granular core portion.

6. The water absorption treatment material according to claim 1, wherein
   the granular core portion has a plurality of the recessed portions, and
   the plurality of recessed portions are arranged at equal intervals from each other on the surface of the granular core portion.

7. The water absorption treatment material according to claim 1, wherein a surface area ratio of the recessed portion with respect to an entire surface of the granular core portion is greater than or equal to 10% and less than or equal to 90%.

8. The water absorption treatment material according to claim 7, wherein the surface area ratio is greater than or equal to 20% and less than or equal to 60%.

9. A method for manufacturing a water absorption treatment material, the method comprising:
   forming a granular core portion having a recessed portion on a surface of the granular core portion; and
   forming a coating layer portion covering the surface of the granular core portion, the coating layer portion being formed such that a portion of the coating layer portion enters the recessed portion of the granular core portion, and the coating layer portion has a recessed coating portion located on an exposed outer surface of the coating layer portion where the coating layer portion enters the recessed portion of the granular core portion such that the recessed coating portion is radially aligned with the recessed portion.

10. The method for manufacturing a water absorption treatment material according to claim 9, wherein the coating layer portion is formed so as to cover an entire surface of the granular core portion.

11. The method for manufacturing a water absorption treatment material according to claim 9, wherein the coating layer portion is formed to cover less than an entire surface of the granular core portion.

12. The method for manufacturing a water absorption treatment material according to claim 9, further comprising using a die having a through hole to perform extrusion granulation on a core portion material that is to constitute the granular core portion.

13. The method for manufacturing a water absorption treatment material according to claim 12, wherein a protruding portion is provided on an inner surface of the through hole.

14. The method for manufacturing a water absorption treatment material according to claim 13, wherein the protruding portion is a protrusion extending in a thickness direction of the die.

15. The method for manufacturing a water absorption treatment material according to claim 13, wherein the protruding portion is a projection provided proximal to an exit of the through hole.

16. The method for manufacturing a water absorption treatment material according to claim 13, wherein a plurality of the protruding portions are provided on the inner surface of the through hole, and the plurality of protruding portions are arranged at equal intervals in a circumferential direction of the through hole.

* * * * *